United States Patent
Yamaguchi

(10) Patent No.: US 7,328,773 B2
(45) Date of Patent: Feb. 12, 2008

(54) OIL PASSAGE SWITCHING VALVE HAVING OIL FILTER

(75) Inventor: Takashi Yamaguchi, Obu (JP)

(73) Assignee: Denso Corporation (JP)

( * ) Notice: Subject to any disclaimer, the term of this patent is extended or adjusted under 35 U.S.C. 154(b) by 714 days.

(21) Appl. No.: 10/868,831

(22) Filed: Jun. 17, 2004

(65) Prior Publication Data

US 2005/0011703 A1    Jan. 20, 2005

(30) Foreign Application Priority Data

Jul. 16, 2003    (JP) ............................ 2003-275309

(51) Int. Cl.
    *F01M 1/00* (2006.01)
(52) U.S. Cl. ............... 184/6.9; 184/105.3; 210/232
(58) Field of Classification Search ............ 184/105.3, 184/6.9; 210/232; 55/483, 487
    See application file for complete search history.

(56) References Cited

U.S. PATENT DOCUMENTS

| | | | | |
|---|---|---|---|---|
| 5,102,436 | A | * | 4/1992 | Grabowski ............... 55/483 |
| 5,169,524 | A | * | 12/1992 | Meiritz et al. ............... 210/232 |
| 5,238,192 | A | | 8/1993 | McNair |
| 5,482,622 | A | | 1/1996 | Stark et al. |
| 5,807,483 | A | | 9/1998 | Cassidy et al. |
| 6,517,718 | B2 | | 2/2003 | Gutierrez et al. |
| 7,041,217 | B1 | * | 5/2006 | Close et al. ............... 210/232 |

FOREIGN PATENT DOCUMENTS

| | | |
|---|---|---|
| EP | 1382807 A2 | 6/2003 |
| JP | 11-063294 | 3/1999 |
| JP | 2000-266235 | 9/2000 |
| JP | 2000-346006 | 12/2000 |
| JP | 2001-004061 | 1/2001 |
| JP | 2001-173806 | 6/2001 |
| JP | 2003-014158 | 1/2003 |

OTHER PUBLICATIONS

French Search Examination Report.
JPO Examination Report (with English translation) dated Jan. 30, 2007.
French Search Examination Report.

* cited by examiner

*Primary Examiner*—David M. Fenstermacher
(74) *Attorney, Agent, or Firm*—Nixon & Vanderhye PC

(57) ABSTRACT

Oil ports formed on a cylindrical sleeve of an oil passage switching valve are covered with respective filters. The filter is formed in a ring shape by rounding a resilient metal strip having plural filter holes formed thereon. The filter clings around the outer periphery of the cylindrical sleeve by its own resiliency. A contacting portion is formed on one of overlapping ends of the filter ring or on both overlapping ends so that the contacting portion engages with the other overlapping end to prevent the filter ring from being enlarged by an oil pressure applied to the filter from its inside. Foreign particles in the oil are surely prevented from entering into the sleeve by the filter covering the oil port in close contact therewith.

20 Claims, 5 Drawing Sheets

OIL PASSAGE SWITCHING VALVE HAVING OIL FILTER

CROSS-REFERENCE TO RELATED APPLICATION

This application is based upon and claims benefit of priority of Japanese Patent Application No. 2003-275309 filed on Jul. 16, 2003, the content of which is incorporated herein by reference.

BACKGROUND OF THE INVENTION

1. Field of the Invention

The present invention relates to a valve for switching oil passages, and more particularly to an oil filter used in the valve for preventing foreign particles contained in oil from entering into the switching valve.

2. Description of Related Art

An example of this type of valve is disclosed in JP-A-2000-346006. Oil having a predetermined oil pressure is supplied to an actuator, such as a variable-valve-timing mechanism for an internal combustion engine, through an oil passage switching valve. The oil is supplied to either a chamber for advancing the valve timing or a chamber for retarding the valve timing by switching the oil passages. The valve is composed of a valve portion and a driving portion for electromagnetically driving a valve body contained in the valve portion. In this type of valve, it is necessary to prevent foreign particles contained in the oil from entering into an inside space of the valve. For this purpose, in the conventional valve system, an oil filter is disposed in an oil passage connecting the valve and the engine.

In the conventional valve system, it is difficult to prevent foreign particles generated in the oil passage between the oil filter and the valve from entering into the valve chamber. Accordingly, it is preferable to dispose the oil filter at a position closest possible to the valve. However, the position of the oil filter is not freely chosen due to restriction from a piping layout.

SUMMARY OF THE INVENTION

The present invention has been made in view of the above-mentioned problem, and an object of the present invention is to provide an improved oil passage switching valve in which oil filters are easily disposed at positions closest to a valve chamber.

The oil passage switching valve according to the present invention is used for controlling oil pressure in an actuator of a variable-valve-timing mechanism (VVT) of an internal combustion engine, for example. Oil contained in an oil tank is pumped up and pressurized by an oil pump, and the pressurized oil is supplied to the valve through an inlet port of the valve. The oil supplied to the valve is sent to either a first chamber of the VVT actuator through a first actuator port of the valve or a second chamber of the VVT actuator through a second actuator port of the valve. The valve functions to selectively switch the oil passages.

The valve is composed of a cylindrical sleeve having the inlet port and the actuator ports, and a valve body slidably disposed in the sleeve and electromagnetically driven for switching the oil passages. The inlet and actuator ports through which the oil flows in and out are covered with respective oil filters to prevent foreign particles contained in the oil from entering into the sleeve. The oil filter is made by rounding a resilient metal strip having plural filter holes. When the metal strip is rounded, both ends of the metal strip are overlapped on each other, forming an inner overlapping portion and an outer overlapping portion. The diameter of the rounded filter is made smaller than the diameter of the sleeve around which the filter is to be disposed, so that the filter clings around the outer periphery of the sleeve by its own resiliency.

A contacting portion is formed on one of the overlapping ends or both overlapping ends, so that the contacting portion firmly engages with the other overlapping end. Thus, the filter ring is prevented from being enlarged by an oil pressure applied thereto from its inside. A biasing portion for further biasing the filter ring in a direction to decrease the diameter of the filter ring may be formed next to the overlapping portion. The contacting portion may be formed in a triangular shape projecting toward the other overlapping portion. The contacting portion may be made to have a curvature which is different from a curvature of the filter ring to secure a firm contact between both overlapping portions. One or more auxiliary contacting portions may be formed next to the main contacting portion to enhance the firm contact between both overlapping portions.

According to the present invention, the filter can be easily disposed to cover the oil ports of the oil passage switching valve, and the filter can surely prevent foreign particles contained in the oil from entering into the valve. Other objects and features of the present invention will become more readily apparent from a better understanding of the preferred embodiments described below with reference to the following drawings.

DETAILED DESCRIPTION OF THE PREFERRED EMBODIMENTS

Figure 1:
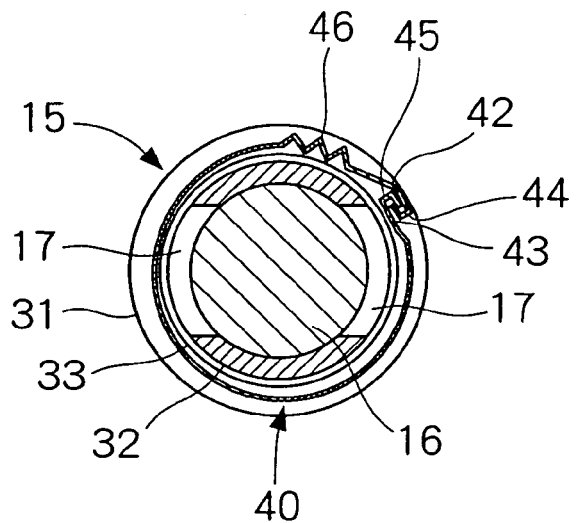
FIG. 1 is a cross-sectional view showing an oil passage switching valve that includes an oil filter as a first embodiment of the present invention, taken along line I-I shown in FIG. 2.

A first embodiment of the present invention will be described with reference to FIGS. 1-3. First, referring to FIG. 2, an entire valve system, in which an oil passage switching valve 10 (also referred to as a valve) is used, will be described. The valve 10 is used for controlling operation of a variable-valve-timing mechanism (VVT) of an internal combustion engine.

Oil in an oil tank 1 is pumped up through an oil passage 21 and is pressurized by a pump 2. The pressurized oil is introduced into the valve 10 through an inlet port 11 and further supplied to an actuator of VVT through actuator ports 17, 18. The oil is drained through a drain port 12 and returned to the oil tank 1 through an oil passage 22. The valve 10 is composed of a valve portion 13 and a driving portion 14. The valve portion 13 includes a cylindrical sleeve 15 and a valve body 16 (shown in FIG. 1) slidably disposed in the sleeve 15. The sleeve 15 has the inlet port 11 and the actuator ports 17, 18. The actuator port 17 is connected to an actuator chamber for advancing the VVT through an oil passage 23, and the other actuator port 18 is connected to an actuator chamber for retarding the VVT through an oil passage 24.

The driving portion 14 contains therein a plunger and a coil for driving the plunger. The coil is energized by supplying electric current through a connector 19. One end of the plunger abuts with the valve body 16 to drive it leftwards in FIG. 2 when the coil is energized. The valve body 16 is biased rightwards by a spring. The valve body 16 takes the position in the sleeve 15 according to an amount of electric power supplied to the coil, and thereby either one of the actuator ports 17 or 18 communicates with the inlet port 11. Thus, the oil is selectively supplied either to the advancing chamber or to the retarding chamber of the VVT.

The cylindrical sleeve 15 has three small-diameter portions 32 and flanges 31 having a larger diameter. The flanges 31 are formed to define an axial length of the small-diameter portion 32. The inlet port 11 and the actuator ports 17, 18 are open to the outer periphery of the respective small-diameter portions 32. An oil filter 40 in a cylindrical shape is disposed around the outer periphery of each small-diameter portion 32 to cover the opening 11, 17, 18. The oil filter 40 is made of a resilient thin metal plate having plural holes 41 uniformly formed thereon (refer to FIG. 3). The diameter of the filter hole is "d".

Now, referring to FIGS. 1 and 3, the oil filter 40 will be described in detail. Though the filter 40 covering the actuator hole 17 is described below, other filters 40 covering the inlet port 11 and the actuator port 18 are the same. As shown in FIG. 1, a metal strip having a width of Lf (refer to FIG. 3) is rounded and disposed around the outer periphery of the small-diameter portion 32. The second end of the metal strip is overlapped on the first end of the metal strip, thereby forming an inner overlapping portion 43 and the outer overlapping portion 42. The length of the overlapping portions 42, 43 in the circumferential direction is arbitrarily set to a proper length.

The inner overlapping portion 43 and the outer overlapping portion 42 include contacting portions 45, 44, respectively. The contacting portion 45 of the inner overlapping portion 43 projects outwardly to engage with the outer overlapping portion 42, while the contacting portion 44 of the outer overlapping portion 42 projects inwardly to engage with the inner overlapping portion 43. Thus, the oil is prevented from flowing through the overlapping portions 43, 42, i.e., foreign particles contained in the oil do not flow through the overlapping portions 43, 42. Both of the contacting portions 45, 44 are formed by bending the ends of the metal strip forming the filter 40. When a force enlarging the diameter of the filter 40 is applied to the filter 40, the circumferential length of the filter 40 tends to be expanded, and thereby the engaging portions 45, 44 further firmly engages with each other. Thus, the diameter of the filter 40 is prevented from being enlarged.

Figure 2:
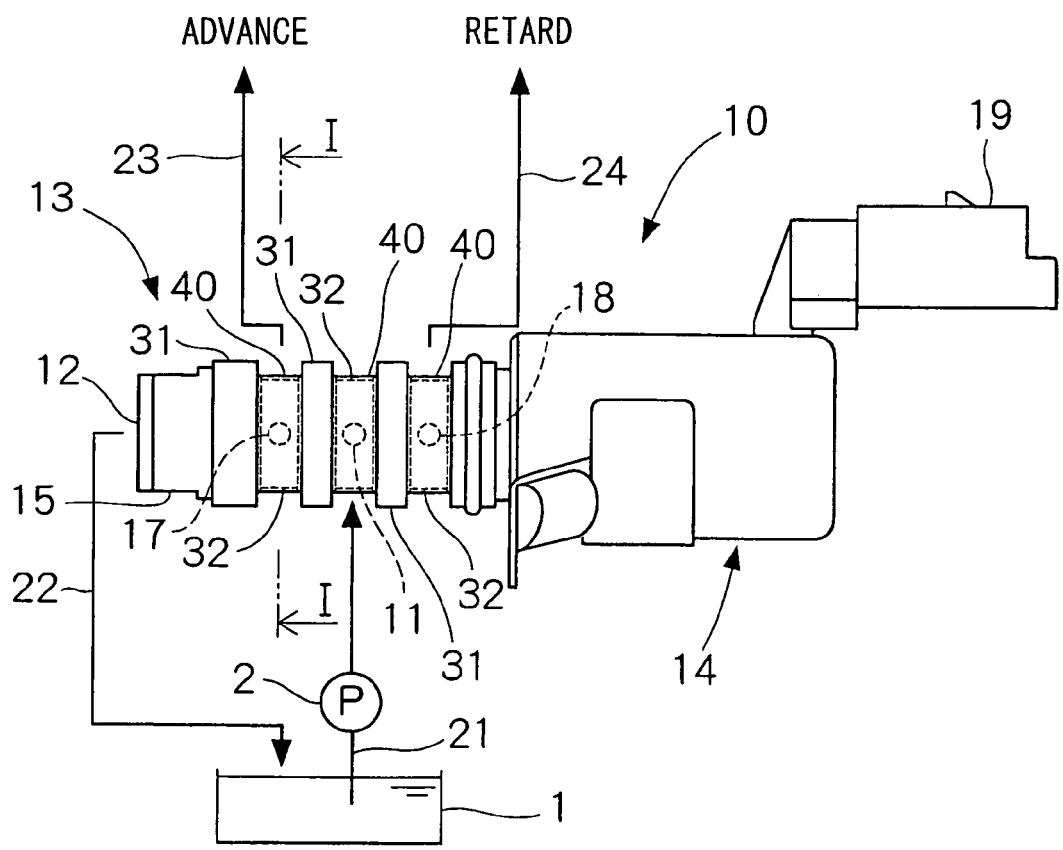
FIG. 2 is a schematic view showing an entire valve system.

As shown in FIG. 1, a biasing portion 46 is formed on a portion of the filter 40. The biasing portion 46 functions to give a biasing force to the filter 40 in a direction to decrease its diameter. In other words, the filter 40 is disposed around the outer periphery of the sleeve 15 in further close contact therewith by the biasing force, and the biasing force prevents the diameter of the filter 40 from being enlarged by the inside oil pressure.

Figure 3:
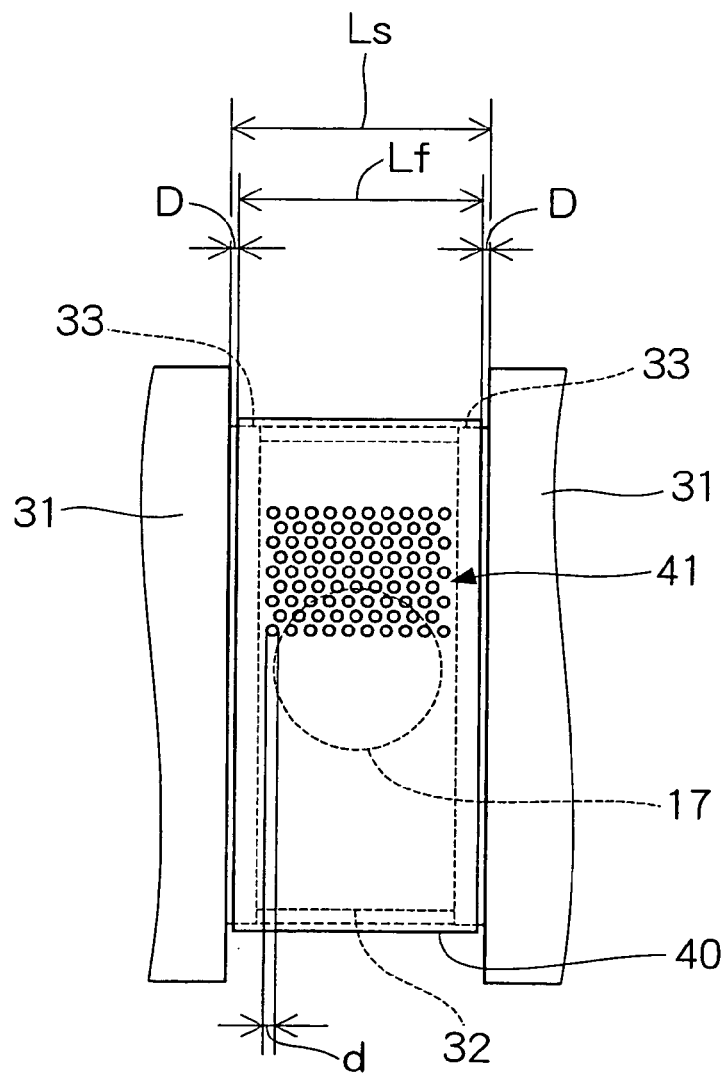
FIG. 3 is a side view showing, in an enlarged scale, a small-diameter portion of the valve where the oil filter is disposed.

Small steps 33 are formed at both axial ends of the small-diameter portion 32, as shown in FIG. 3. The diameter of the small step 33 is a little larger than the diameter of the small-diameter portion 32. The filter 40 is supported on the small steps 33 at both axial ends thereof. As a result, a small circumferential space is formed between the small-diameter portion 32 and the filter 40. The oil flows through the small circumferential space, and therefore, the oil passes through the filter 40 not only at the portion where the actuator port 17 is located but also at all other portions. Therefore, all the circumferential area of the filter 40 is utilized as a filtering surface.

As shown in FIG. 3, the axial length Lf of the filter 40 is made a litter smaller than the distance Ls between flanges 31 so that the filter 40 can be easily disposed in the space between the flanges 31. However, Ls and Lf are so made that a gap D between one axial end of the filter 40 and the flange 31 does no exceed the diameter d of the filter hole 41, so that foreign particles which do not pass through the filter holes 41 cannot pass through the gap D. The axial length Lf of the filter 40 is so made that the gap D always becomes smaller than the hole size d even when one axial end of the filter 40 contacts the flange 31. In other words, the axial length Lf is made to satisfy the formula: (Lf+d)>Ls.

After the filter 40 is formed by rounding the thin metal strip having resiliency, the filter 40 is disposed around the outer periphery of the small-diameter portion 32. A distance between the first end forming the inner overlapping portion 43 and the second end forming the outer overlapping portion 42 is forcibly enlarged against the resiliency of the rounded filter 40 so that the small-diameter portion 32 goes through the enlarged opening of the filter 40. After the sleeve 15 is disposed inside the filter 40, the force enlarging the opening of the filter 40 is released. Thus, the filter 40 is disposed around the outer periphery of the small-diameter portion 32 in close contact therewith by the resiliency of the filter 40 itself.

Advantages attained in the first embodiment described above will be summarized below. The filter 40 including the contacting portions 44, 45 and the biasing portion 46 can be integrally made from a single metal strip having filter holes 41. Therefore, the process of manufacturing the filter 40 is very simple. Since the filter 40 is made of a resilient metal plate, it is closely attached to the outer periphery of the sleeve 15 by its own resiliency without using any other member. The filter 40 further closely contacts the outer periphery of the sleeve 15 by the biasing force of the biasing member 46. When oil pressure is applied to the filter 40 in the direction to enlarge its diameter, the filter 40 is prevented from being enlarged because the contacting portions 44, 45 engage with each other.

Since the filter 40 is disposed around the sleeve 15 in contact therewith, i.e. at the position closest to the valve 10, to cover the inlet port 11 and the actuator ports 17, 18, foreign particles generated in the oil passages 23, 24 connecting the valve 10 and the VVT actuator are prevented, without fail, from entering into the valve 10. In addition, the filter 40 covering the inlet port 11 surely prevents foreign particles contained in the oil tank 1 and the oil passage 21 from entering into the valve 10.

Further, no foreign particles enter into the valve 10 through the gap D between the flange 31 and the axial end of the filter 40 because the gap D is made smaller than the diameter d of the filter hole 41. Also, foreign particles are prevented from entering into the valve 10 through the overlapping portions 42, 43 because the contacting portions 44, 45 engage with each other.

Figure 4:
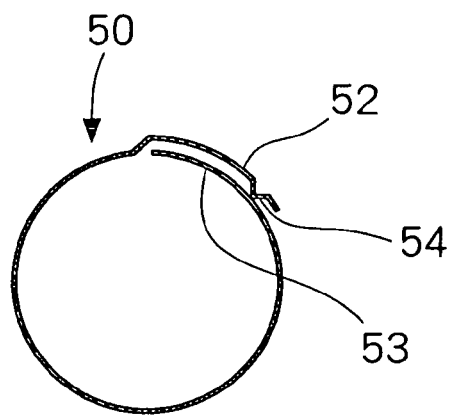
FIG. 4 is a cross-sectional view showing an oil filter as a second embodiment of the present invention.

A filter 50 as a second embodiment of the present invention will be described with reference to FIG. 4. In this embodiment, the filter 50 is slightly modified from the filter 40 in the first embodiment. The filter 50 is also made of a resilient thin metal plate and includes an inner overlapping portion 53 and an outer overlapping portion 52. A contacting portion 54 projecting in a triangular shape toward the inner overlapping portion 53 is formed on the outer overlapping portion 52 in the vicinity of the second end (end of the outer overlapping portion 52). Foreign particles in the oil are prevented from entering into the inside space of the valve 10 through the overlapping portions 52, 53 because the contacting portion 54 contacts the inner overlapping portion 53.

The diameter of the filter 50 is made smaller than the diameter of the small-diameter portion 32. To dispose the filter 50 around the outer periphery of the small-diameter portion 32, the closed ends of the filter 50 are forcibly opened. After the filter 50 is disposed around the outer periphery of the small-diameter portion 32, it firmly clings thereto by its own resiliency. Therefore, there is no need to provide any other member to keep the position of the filter 50.

Figure 5:
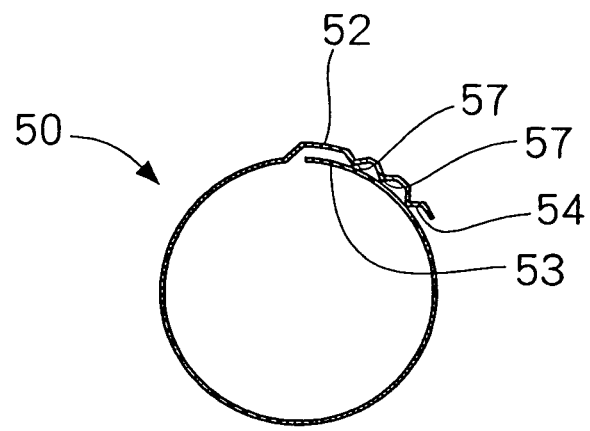
FIG. 5 is a cross-sectional view showing an oil filter as a third embodiment of the present invention.

A filter 50 as a third embodiment of the present invention is shown in FIG. 5. The filter 50 shown here has a form a little modified from that of the second embodiment. That is, in addition to the contacting portion 54, two auxiliary contacting portions 57 are formed on the outer overlapping portion 52. The end of the outer overlapping portion 52, the contacting portion 54, the auxiliary contacting portions 57 are positioned in this order. The shape of the auxiliary contacting portion 57 is similar to the contacting portion 54 which is in a triangular shape. At least one auxiliary contacting portion 57 is formed, but more than two auxiliary contacting portions 57 may be made.

If contact between the contacting portion 54 and the inner overlapping portion 53 becomes loose for some reason such as abrasion wear, auxiliary contacting portions 57 perform the roll of the contacting portion 54. Therefore, the contact between the inner overlapping portion 53 and the outer overlapping portion 52 is further surely maintained. Though the contacting portion 54 and the auxiliary contacting portions 57 are formed on the outer overlapping portion 52 so that they project toward the inner overlapping portion 53, both projections 54, 57 may be formed on the inner overlapping portion 53 to project toward the outer overlapping portion 52. Alternatively, those projections may be formed on both the inner and outer overlapping portions 53, 52.

Figure 6:
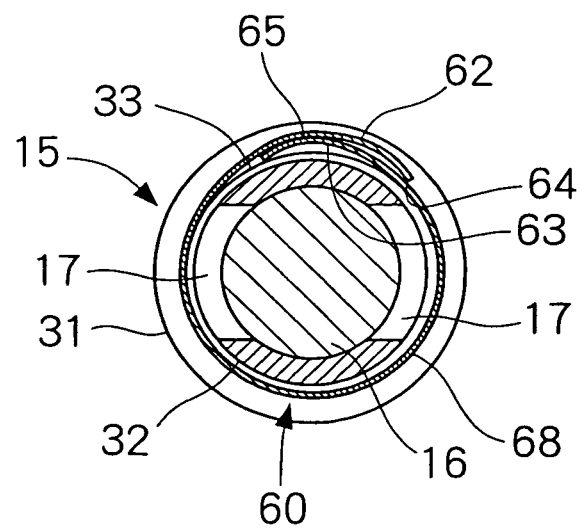
FIG. 6 is a cross-sectional view showing an oil passage switching valve that includes an oil filter as a fourth embodiment of the present invention, taken along line I-I shown in FIG. 2.

A filter 60 as a fourth embodiment of the present invention is shown in FIG. 6. In this embodiment, too, the filter 60 is formed by rounding a resilient thin metal plate in the same manner as in the foregoing embodiments. The filter 60, however, is rounded to form three different curvatures. A cylindrical portion 68 having a substantially circular form is formed at the middle portion of the filter 60, while a contacting portion 64 and another contacting portion 65 having respectively different curvatures are formed on an outer overlapping portion 62 and on an inner overlapping portion 63, respectively. The contacting portion 64 is bent toward the inner overlapping portion 63 to contact therewith, and the contacting portion 65 is formed to swell toward the outer overlapping portion 62 to contact therewith.

The diameter of the filer 60 is made a little smaller than the diameter of the small-diameter portion 32 before the filter is disposed on the sleeve 15. When the filter 60 is disposed around the small diameter portion 32, the curvature of the cylindrical portion 68 becomes equal to the curvature of the small step 33 on which the filter 60 is supported. On the other hand, the curvatures of the contacting portions 64, 65 are not equal to that of the small step 33. Therefore, the contacting portion 64 contacts the inner overlapping portion 63, and the contacting portion 65 contacts the outer overlapping portion 62. Therefore, when the filter 60 is disposed around the sleeve 15, the filter 60 clings to the sleeve 15 by its own resiliency, and the clinging force is further enhanced by the contacting portions 64, 65 having different curvatures from each other. Foreign particles are surely prevented from entering into the inside space of the valve 10 through the contacting portions 62, 63.

Figure 7A:
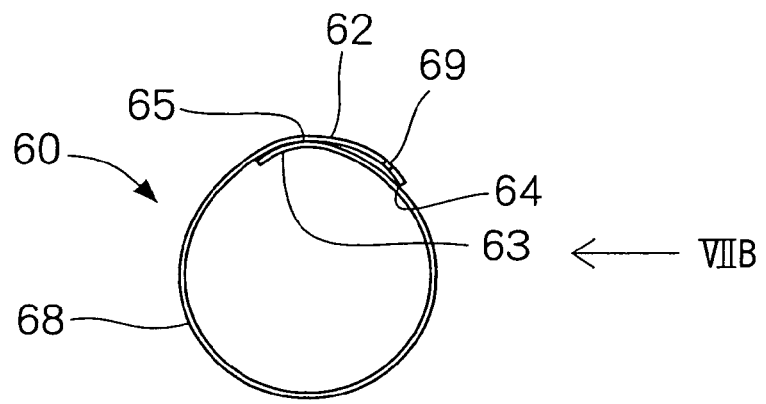
FIG. 7A is a plan view showing an oil filter as a fifth embodiment of the present invention.
Figure 7B:
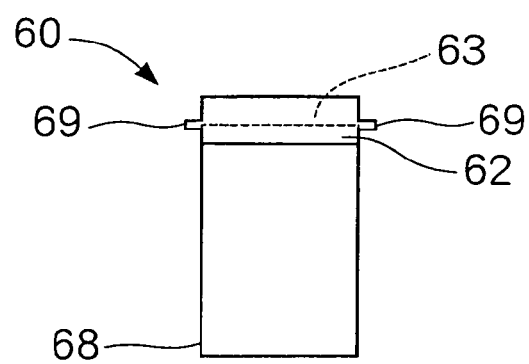
FIG. 7B is a side view, viewed from direction VIIB in FIG. 7A, showing the oil filter shown in FIG. 7A.
Figure 8:
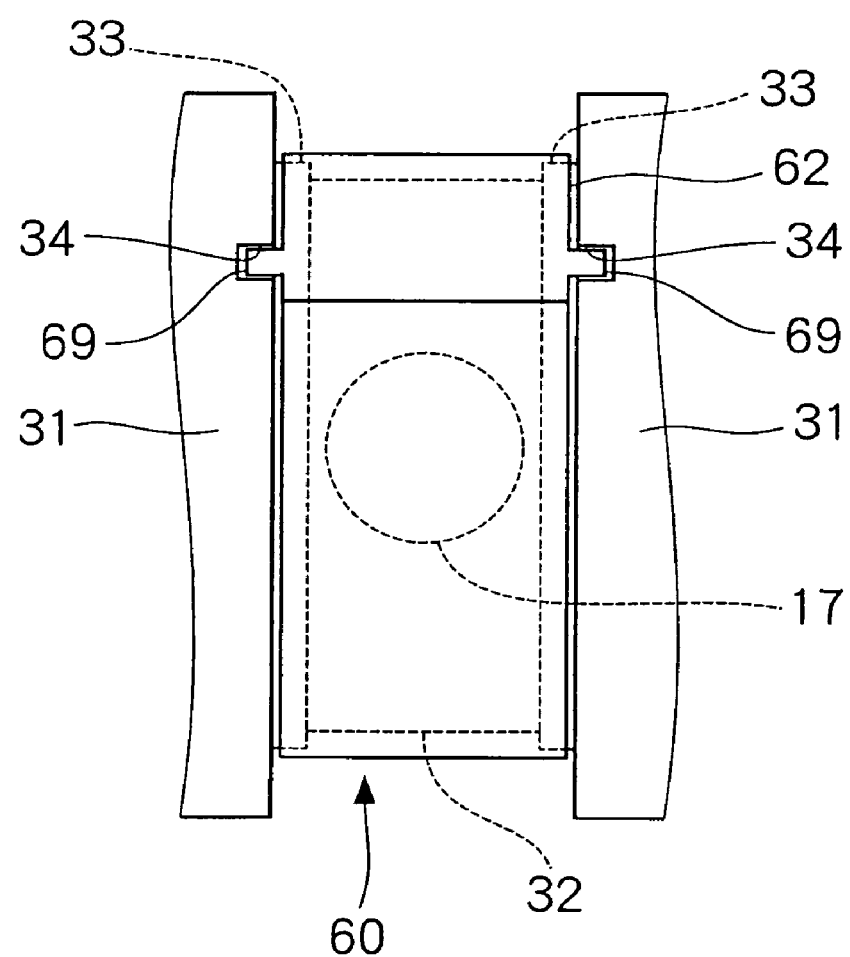
FIG. 8 is a side view showing, in an enlarged scale, a small-diameter portion where the oil filter shown in FIG. 7A is disposed.

A filter 60 as a fifth embodiment of the present invention will be described with reference to FIGS. 7A, 7B and 8. In this embodiment, the filter 60 is substantially the same as the fourth embodiment, but a pair of projections 69 is additionally formed on both axial sides of the filter 60, as better seen in FIG. 7B. The projections 69 are formed on the outer overlapping portion 62. As shown in FIG. 8, depressions 34 engaging with the projections 69 are formed on the side of flanges 31. The depressions 34 are so positioned that the overlapping portions 62, 63 do not cover the actuator port 17 when the projections 69 are engaged with the depressions 34. The filter 60 is prevented from rotating relative to the sleeve 15 by engaging the projections 69 with the depressions 34.

Since the actuator port 17 is covered only with a single layer portion of the filter 60, i.e., with the cylindrical portion 68, the oil flowing in or out of the actuator port 17 does not go through the overlapping portions 62, 63. Accordingly, a pressure loss in the oil flow is kept low.

Though the oil filter covering the actuator port 17 is described above, other filters covering the inlet port 11 and the other actuator port 18 can be similarly formed and disposed. The positions of the ports in the sleeve 15 may be variously modified. Each embodiment described above is not only utilized individually but also combined with other embodiments.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An oil passage switching valve comprising:
   a cylindrical sleeve having openings through which oil flows;
   a valve body slidably disposed in the cylindrical sleeve, the valve body being moved in the sleeve so that the openings of the sleeve are selectively opened or closed to thereby switch oil passages; and
   an oil filter closely surrounding the outer periphery of the cylindrical sleeve to cover the opening so that foreign particles contained in the oil are prevented from entering into the sleeve, wherein:
   the oil filter is formed in a cylindrical shape by rounding a strip having a first end and a second end, the second end being overlapped on the first end across an entire width of the strip, the first end forming an inner overlapping portion and the second end forming an outer overlapping portion; and at least either one of the inner and outer overlapping portions includes a contacting portion projected toward the other overlapping portion, the contacting porting being formed by bending the respective end of the strip.

2. The oil passage switching valve as in claim 1, wherein:
both of the inner overlapping portion and the outer overlapping portion include respective contacting portions; and the contacting portions firmly engage with each other when a force enlarging a diameter of the oil filter is applied thereto.

3. The oil passage switching valve as in claim 1, wherein:
the oil filter includes a biasing portion that biases the oil filter in a direction to decrease a diameter thereof.

4. The oil passage switching valve as in claim 1, wherein:
the oil filter is rounded in a cylindrical shape before the oil filter is attached to the sleeve so that a diameter of the oil filter is made smaller than a diameter of the sleeve.

5. The oil passage switching valve as in claim 1, wherein:
the contacting portion is formed in the vicinity of the first end and/or the second end.

6. The oil passage switching valve as in claim 5, wherein:
one or more auxiliary contacting portions are formed next to the contacting portion.

7. The oil passage switching valve as in claim 1, wherein:
the contacting portion is projected in a triangular shape in the radial direction of the sleeve.

8. The oil passage switching valve as in claim 5, wherein:
the contacting portion formed on the overlapping portion is curved with a curvature which is different from a curvature of the oil filter rounded in a cylindrical shape.

9. The oil passage switching valve as in claim 1, wherein:
flanges having a diameter larger than a diameter of the outer periphery of the sleeve around which the oil filter is disposed are formed on the sleeve at both axial sides of the oil filter; and
a gap between the axial side of the oil filter and the flange is smaller than a diameter of holes formed in the oil filter.

10. The oil passage switching valve as in claim 9, wherein:
a projection is formed on the axial side of the oil filter and a depression is formed on an axial sidewall of the flange facing the axial side of the oil filter; and
the projection is engaged with the depression so that the oil filter does not rotate around the outer periphery of the sleeve.

11. The oil passage switching valve as in claim 10, wherein:
the projection is formed on both axial sides of the outer overlapping portion.

12. The oil passage switching valve as in claim 1, wherein:
the oil filter is made of a resilient material and the outer overlapping portion is biased toward the inner overlapping portion by resiliency of the resilient material, so that the oil filter closely clings around the outer periphery of the cylindrical sleeve.

13. An oil passage switching valve comprising:
a cylindrical sleeve having openings through which oil flows;
a valve body slidably disposed in the cylindrical sleeve, the valve body being moved in the sleeve so that the openings of the sleeve are selectively opened or closed to thereby switch oil passages; and
an oil filter closely surrounding the outer periphery of the cylindrical sleeve to cover the opening so that foreign particles contained in the oil are prevented from entering into the sleeve, wherein:
the oil filter is formed in a cylindrical shape by rounding a strip having a first end and a second end, the second end being overlapped on the first end, the first end forming an inner overlapping portion and the second end forming an outer overlapping portion;
at least either one of the inner and outer overlapping portions includes a contacting portion projected toward the other overlapping portion;
flanges having a diameter larger than a diameter of the outer periphery of the sleeve around which the oil filter is disposed are formed on the sleeve at both axial sides of the oil filter; and
a gap between the axial side of the oil filter and the flange is smaller than a diameter of holes formed in the oil filter.

14. The oil passage switching valve as in claim 13, wherein:
a projection is formed on the axial side of the oil filter and a depression is formed on the axial side wall of the flange facing the axial side of the oil filter; and
the projection is engaged with the depression so that the oil filter does not rotate around the outer periphery of the sleeve.

15. The oil passage switching valve as in claim 14, wherein:
the projection is formed on both axial sides of the outer overlapping portion.

16. The oil passage switching valve as in claim 1, wherein the contacting portion formed by bending the end of the strip is one of bent in an arc and accordion folded in a triangular shape.

17. The oil passage switching valve as in claim 1, wherein the contacting portion formed by bending the end of the strip comprises a plurality of contacting portions.

18. The oil passage switching valve as in claim 17, wherein the plurality of contacting portions have a triangular shape formed by bending the end of the strip.

19. The oil passage switching valve as in claim 1, wherein the contacting portion is bent to have a different curvature from a remainder of the filter strip.

20. The oil passage switching valve as in claim 1, wherein each end of the strip has a contacting portion formed by bending to define ends having different curvatures from each other.

* * * * *